(12) United States Patent
Gissler et al.

(10) Patent No.: US 11,434,745 B2
(45) Date of Patent: Sep. 6, 2022

(54) USING A DOWNHOLE ACCELEROMETER TO MONITOR VIBRATION

(71) Applicant: Halliburton Energy Services, Inc., Houston, TX (US)

(72) Inventors: Robert W. Gissler, Spring, TX (US); Aswin Balasubramanian, Spring, TX (US); Quanling Zheng, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 334 days.

(21) Appl. No.: 16/608,692

(22) PCT Filed: Dec. 7, 2018

(86) PCT No.: PCT/US2018/064434
§ 371 (c)(1),
(2) Date: Oct. 25, 2019

(87) PCT Pub. No.: WO2020/117265
PCT Pub. Date: Jun. 11, 2020

(65) Prior Publication Data
US 2020/0347716 A1    Nov. 5, 2020

(51) Int. Cl.
*E21B 47/00* (2012.01)
*E21B 34/06* (2006.01)
*G01L 19/00* (2006.01)
*G01P 15/18* (2013.01)
*E21B 47/07* (2012.01)
*E21B 47/06* (2012.01)

(52) U.S. Cl.
CPC .............. *E21B 47/00* (2013.01); *E21B 34/06* (2013.01); *G01L 19/0092* (2013.01); *G01P 15/18* (2013.01); *E21B 47/06* (2013.01); *E21B 47/07* (2020.05)

(58) Field of Classification Search
CPC .......... E21B 47/00; E21B 34/06; E21B 47/06; E21B 47/07; E21B 43/003; G01L 19/0092; G01P 15/18; G01P 15/00; G01D 21/02
See application file for complete search history.

(56) References Cited

U.S. PATENT DOCUMENTS

| 4,188,823 A | 2/1980 | Hood |
| 4,660,638 A * | 4/1987 | Yates, Jr. ................ E21B 47/06 340/853.9 |
| 4,903,245 A | 2/1990 | Close et al. |

(Continued)

OTHER PUBLICATIONS

Patent Cooperation Treaty, International Search Report & Written Opinion, International Application No. PCT/US2018/064434, which is a PCT parent of the instant application, dated Sep. 4, 2019.

*Primary Examiner* — Brad Harcourt
(74) *Attorney, Agent, or Firm* — Scott Richardson; C.Tumey Law Group PLLC

(57) ABSTRACT

A well bore completion tool includes an accelerometer having an accelerometer output representative of acceleration of the well bore completion tool. The well bore completion tool includes a signal conditioning device coupled to the accelerometer output and producing a conditioned accelerometer output. The well bore completion tool includes an uplink coupled to the conditioned accelerometer output.

20 Claims, 3 Drawing Sheets

(56) References Cited

U.S. PATENT DOCUMENTS

| | | | |
|---|---|---|---|
| 5,083,452 A * | 1/1992 | Hope | E21B 47/107 |
| | | | 73/61.49 |
| 5,359,888 A | 11/1994 | Hagen | |
| 2002/0057211 A1 | 5/2002 | Tubel et al. | |
| 2010/0207019 A1 | 8/2010 | Hartog et al. | |
| 2012/0222900 A1 | 9/2012 | Rodney et al. | |
| 2014/0083682 A1 | 3/2014 | Grigsby et al. | |
| 2014/0083685 A1* | 3/2014 | Tips | E21B 47/135 |
| | | | 166/250.01 |
| 2016/0010449 A1* | 1/2016 | Liu | E21B 47/24 |
| | | | 166/250.01 |
| 2019/0120048 A1* | 4/2019 | Coffin | E21B 47/07 |
| 2020/0291763 A1* | 9/2020 | Utsuzawa | E21B 47/00 |

\* cited by examiner

USING A DOWNHOLE ACCELEROMETER TO MONITOR VIBRATION

BACKGROUND

Vibrations in completed wells can cause failures of equipment located in the well. In addition, downhole equipment placed in a well may be more susceptible to vibration than appreciated. Monitoring downhole vibrations to address these issues is a challenge.

DETAILED DESCRIPTION

Figure 1:
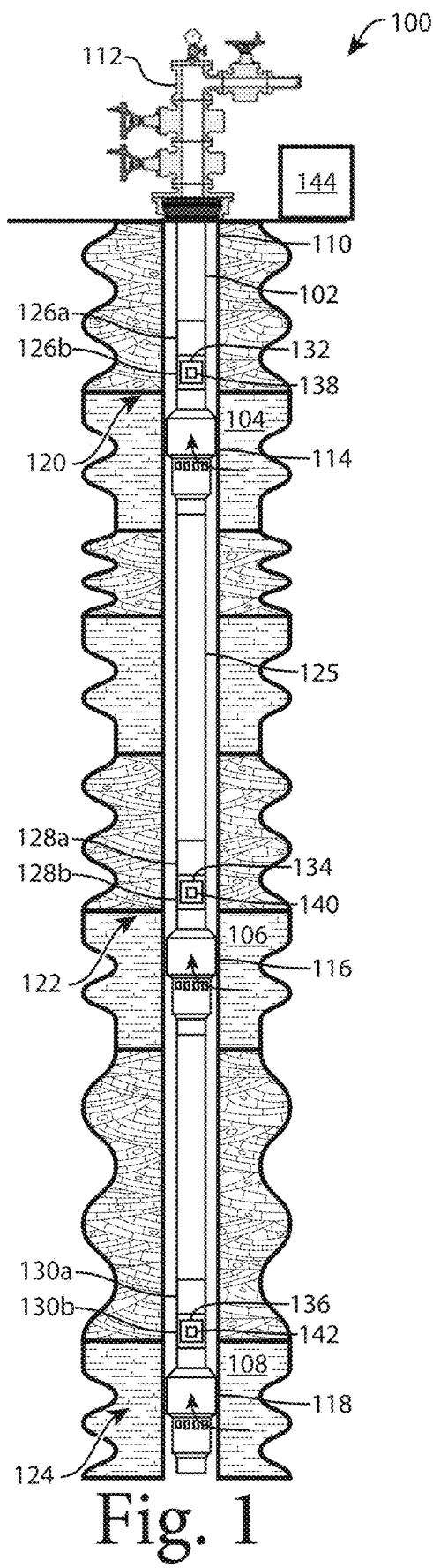
FIG. 1 is a schematic showing an example production system.

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Flow dynamics in a well bore can induce vibration that can cause corrosive or vibration damage to downhole equipment in the well bore, including flow control devices, electrical equipment, cable, etc. Turbulent flow is an example of such a flow-induced vibration. Turbulent flow can be generated in different scenarios. For example, in partial penetration, i.e., in which only a portion of the productive formation has been drilled or perforated, gas or oil that is flowing from the reservoir to this limited area may cause large pressure gradients near the wellbore, resulting in turbulent flow. Fluid flow through an interval control valve (ICV), which may control the entry of fluids from a zone in the well bore into a production tubing for transportation to the surface or the injection of fluids into the zone for stimulation purposes, may also reach turbulent velocity, thus generating additional pressure drop and, in the production scenario, reducing the productivity of the well. Having debris lodged at the ICV could also induce turbulent flow during injection or production. This kind of turbulent flow can cause damage to the downhole equipment, including, for example, the ICV, electronic control devices, and the tubing encased conductor ("TEC").

Flow-induced vibration can also arise with high production or injection rates. Vibrations can be induced if such rates are too high, causing the flow to transition from a laminar pipe flow to a flow-induced vibration.

Flow-induced vibration can also result from the configuration of the downhole equipment. For example, flow-induced vibration can result if the pipe through which the fluids are flowing has long spans between supports or if the supports do not have the size or rigidity to avoid the vibrations.

Further, flow-induced vibration can result from the zonal tool configuration described below in which higher flow rates may be encountered even though each zone is operating within specified flow limits or if one or more of the zones is operating outside specified limits because of a decision of an owner or operator.

In a technique for detecting and monitoring vibration in a well bore, vibration is monitored as an indication of flow-induced vibration. The technique also detects vibration caused by mechanisms other than turbulent flow, such as a part extending into the fluid flow such that the properties of the fluid and the rate of flow cause the part to vibrate, or vibration-causing resonance in an ICV or another piece of equipment that may not be induced by the flow of fluid, or similar vibration-inducing mechanisms. Such information can be used as feedback for ICV control, as discussed below, for example to optimize flow or to avoid damage to downhole equipment. Such information can also be used as part of failure analysis of downhole equipment to fine tune the qualification process for downhole equipment.

FIG. 1 is a schematic showing an example production system. The example shown in FIG. 1 is highly simplified and leaves out many details that would be present in an actual production system. A production system 100 may include a production tubing 102 that carries fluids from zones 104, 106, 108 that produce fluids, such as hydrocarbons, from a well 110 to equipment 112 that may be located on the earth's surface, on a sea bed, or an intermediate location above the sea bed but beneath the surface of the sea. The fluids are communicated between the production tubing 102 and respective formations 104, 106, 108 by one or more ICVs 114, 116, 118. The ICVs 114, 116, 118 can be fully open, fully closed, or partially open and, as such, provide points of control by which fluid communication between the production tubing 102 and the formations 104, 106, 108 can be controlled. The ICVs 114, 116, 118 are part of respective zonal control assemblies 120, 122, 124. The zonal control assemblies 120, 122, 124 may include one or more completion tools 126a, 126b, 128a, 128b, 130a, 130b. While FIG. 1 shows three producing zones 104, 106, 108 and three respective zonal control assemblies 120, 122, 124, it will be understood that the production system may include any number of producing zones and zonal control assemblies. A completion string 125 includes the production tubing 102 and the zonal control assemblies 120, 122, 124.

One or more of the completion tools 126b, 128b, 130b may include a Sensor Actuator Module ("SAM") 132, 134, 136 that is a control module that operates a respective ICV (i.e., SAM 132 operates ICV 114, SAM 134 operates ICV 116, and SAM 136 operates ICV 118) to open or close the ICV or to place the ICV in a partially open condition. As such, the SAMs 132, 134, 136 provide points of control that can be manipulated to affect production from the well 110 or injection into the well 110. SAMs 132, 134, 136 may also include various sensors, such as temperature and pressure sensors and sensors for hydraulics that are used to operate the ICVs 114, 116, 118. The SAM may include hybridized electronics (i.e., electronics contained in environmentally controlled packaging) that are capable of working in the extreme environment encountered in a borehole. The SAMs 132, 134, 136 may include accelerometers 138, 140, 142.

The accelerometers 138, 140, 142 measure acceleration of the device to which they are attached. Acceleration is an indicator of vibration and vibration in a production tubing may be an indicator of one of the mechanisms of flow-induced vibration discussed above in the completion string 125. Thus, accelerometer 138 measures acceleration of (and thus vibration of) the SAM 132, acceleration of (and thus flow-induced vibration of) the completion tool 126b, and acceleration of (and thus flow-induced vibration of) the completion string 125 near the ICV 114. Similarly, accelerometer 140 measures acceleration of (and thus vibration of) the SAM 134, acceleration of (and thus flow-induced vibration of) the completion tool 128b, and acceleration of (and thus flow-induced vibration of) the completion string 125 near the ICV 116. Similarly, accelerometer 142 measures acceleration of (and thus vibration of) the SAM 136, acceleration of (and thus flow-induced vibration of) the completion tool 130b, and acceleration of (and thus flow-induced vibration of) the completion string 125 near the ICV 118.

Data produced by the accelerometers 138, 140, 142 may be communicated to a processor, such as processor 144, that may be on the surface of the earth, in a remote location, or at the same location as the equipment 112. Alternatively, the processor may be located in one of the zonal control assemblies 120, 122, 124, in one of the SAMs 132, 134, 136, or in another practical location. The communication of the data produced by the accelerometers 138, 140, 142 to the processor 144 may be by a wired connection, a wireless connection, by pulse telemetry, or any other suitable communications medium.

The accelerometers 138, 140, 142 may be two-axis high temperature accelerometers, such as the ADXL206 device provided by Analog Devices, Inc. Such devices measure acceleration in two orthogonal directions.

The accelerometers 138, 140, 142 may be three-axis high temperature accelerometers. Such devices measure acceleration in three orthogonal directions.

Figure 2:
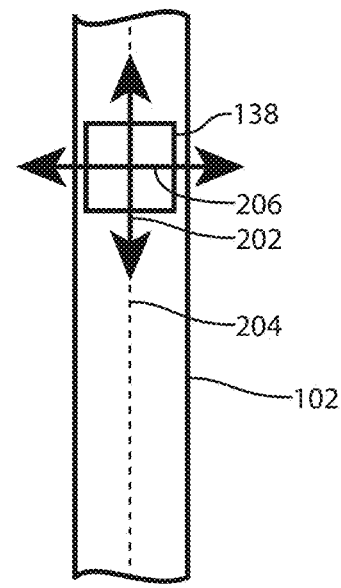
FIG. 2 is a simplified schematic showing the relationship between the orientation of the axes of sensitivity of the accelerometer to the production tubing.

FIG. 2 is a simplified schematic showing the relationship between the orientation of the axes of sensitivity of the accelerometer to the production tubing. If the accelerometers 138, 140, 142 are two-axis accelerometers, the accelerometer may be arranged so that one of its two axes of sensitivity 202 is parallel to a longitudinal axis 204 of the production tubing 102 and the other axis of sensitivity 206 is perpendicular to the longitudinal axis 204 of the production tubing 102. Other orientations are possible and are within the scope of the appended claims. For example, the orientation could be rotated 45 degrees so that each axis 202, 206 is sensitive to acceleration in each of the directions discussed above. Similarly, the orientation could be rotated 90 degrees so that the axis of sensitivity 206 is perpendicular to the sheet of paper upon which FIG. 2 is illustrated.

The accelerometer 138, 140, 142 may have a separate analog output for each of the orthogonal directions, with the magnitude of the analog output being proportional to the current acceleration of the device in gravitational units ("g"). The accelerometer 138, 140, 142 may have a single digital output that includes a digital data stream that includes digitized representations of the current acceleration of the device in each of the three orthogonal directions.

Figure 3:
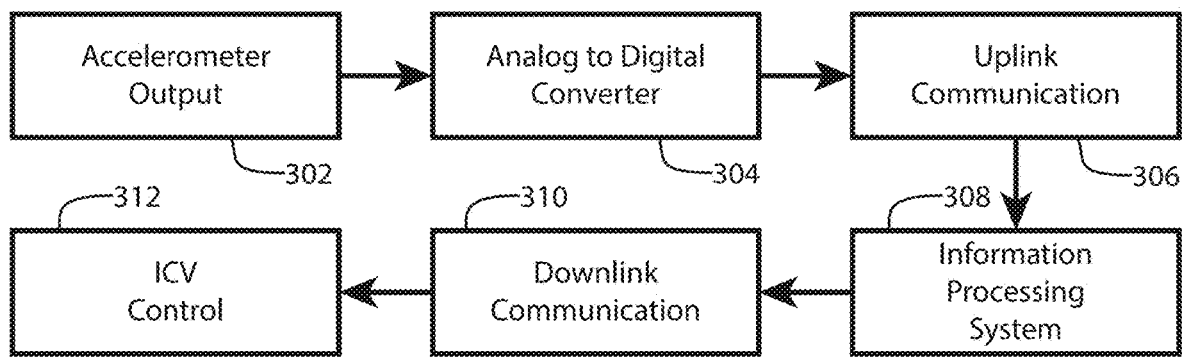
FIG. 3 is a block diagram showing accelerometer signal processing and a control loop including an uplink and a downlink.

FIG. 3 is a block diagram showing accelerometer signal processing and a control loop including an uplink and a downlink. The accelerometer output 302 may be conditioned, for example by filtering, and converted to a digital signal by an analog to digital converter 304. The digital signal may be uplinked by an uplink communication system 306 to processor 144 where it may be processed by an information processing system 308. The output of the information processing system 308, which may be commands to change the settings of an ICV 114, 116, 118, may be downlinked by a downlink communication system 310 to an ICV control 312, such as one of the SAMs 132, 134, 136.

Figure 4:
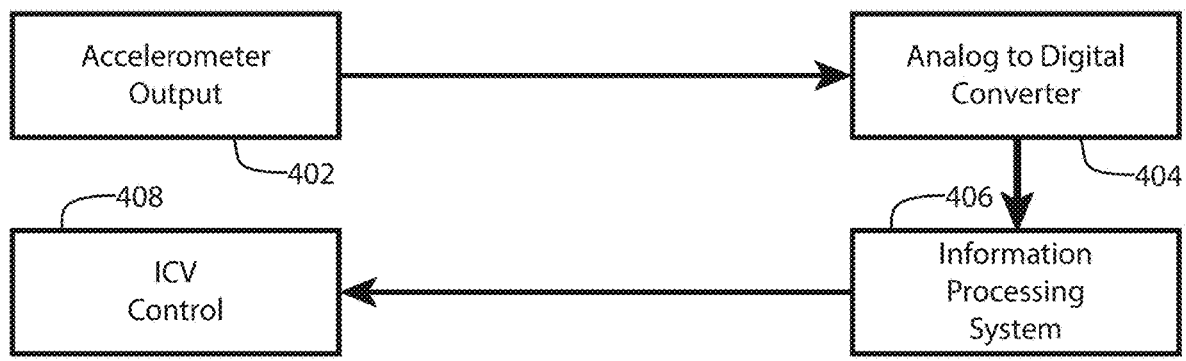
FIG. 4 is a block diagram showing accelerometer signal processing and a control loop in which processing is performed downhole.

FIG. 4 is a block diagram showing accelerometer signal processing and a control loop in which processing is performed downhole. The accelerometer output 402 may be conditioned, for example by filtering, and converted to a digital signal by an analog to digital converter 404. The digital signal may be processed by an information processing system 406, which may be located downhole. The output of the information processing system 406, which may be commands to change the settings of one or more of the ICVs 114, 116, 118, may be supplied to an ICV control 408, such as one or more of the SAMs 132, 134, 136.

Figure 5:
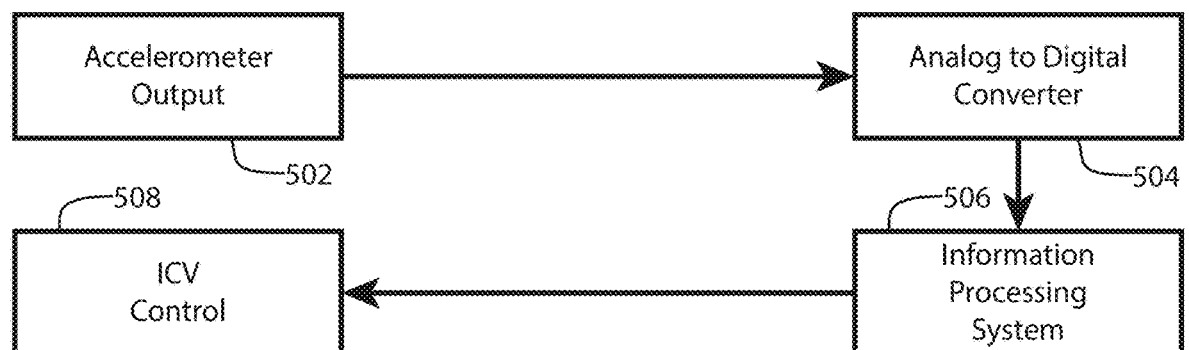
FIG. 5 is a block diagram showing accelerometer signal processing and a control loop including coordination between information processing systems.

FIG. 5 is a block diagram showing accelerometer signal processing and a control loop including coordination between information processing systems. The accelerometer output 502 may be converted to a digital signal by an analog to digital converter 504. The digital signal may be processed by an information processing system 506, which may be located downhole and which may coordinate with other information processing systems with access to other accelerometers and ICV controls. The output of the information processing system 508, which may be commands to change the settings of one or more ICVs 114, 116, 118, may be supplied to an ICV control 508, such as one or more of the SAMs 132, 134, 136.

The information processing system 308, 406, 506 process the data received from the accelerometer 138, 140, 142 to determine what commands, if any, should be sent to the ICV controls 312, 408, 508. The information processing system 308, 406, 506 may process the data in the time domain. For example, the information processing system 308, 406, 506 may track the amount of time that the accelerometer data reflects acceleration above a threshold level for a threshold period of time to determine that the accelerometer 138, 140, 142, and therefore the production tubing 102 or the ICV 114, 116, 118 or other equipment or fixtures of the production system 100, are vibrating at with an intensity that may be harmful.

The information processing system 308, 406, 506 may process the data in the frequency domain. For example, the information processing system 308, 406, 506 may process the received accelerometer data through a process to determine the spectral content of the signal, such as a Fourier transform or a Fast Fourier transform ("FFT"). The information processing system 308, 406, 506 may analyze the resulting spectral information to determine that the accelerometer 138, 140, 142, and therefore the production tubing 102 or the ICV 114, 116, 118 or other equipment or fixtures of the production system 100, is vibrating at a frequency, frequencies, or band of frequencies that may be harmful.

The information processing system 308, 406, 506 may process the data in both the frequency and the time domain.

Once the information processing system 308, 406, 506 determines through one or more of the analyses described above that harm to equipment or fixtures may be possible, the information processing system 308, 406, 506 may issue commands to the ICV control 312, 408, 508 to attempt to remedy the problem. Such commands may be to open or to close the respective ICV 114, 116, 118 or to change the degree to which such ICV 114, 116, 118 is open (for example from fully open to 80 percent open).

Subsequently, the information processing system 308, 406, 506 may analyze later-received data from the accelerometers to determine whether the earlier-issued commands to the ICV control 312, 408, 508 have produced the desired effect. If they have not, additional adjustments may be made by the information processing system 308, 406, 506 to the ICV 114, 116, 118 through the ICV control 312, 408, 508.

In the system shown in FIG. 4, the processing described above is done downhole and may not require intervention from a processor on the surface.

In the system shown in FIG. 5, the information processing system 506 may command the ICV 114, 116, 118 through the ICV control 508 and it may also command another ICV 114, 116, 118 through another ICV control 312, 408. In this way, the ICVs 114, 116, 118 may be controlled as a system, rather than individually, taking into account the effect that controlling one ICV 114, 116, 118 may have on the vibration near another ICV 114, 116, 118.

A history of the commands sent from the information processing system 308, 406, 506 to the ICV 114, 116, 118 through the ICV control 312, 408, 508 and the result of those commands on the accelerometer data may be compiled and stored, for example by processor 144. Such data may be used to adjust the processing performed by the information processing system 308, 406, 506 to track problems that may be developing in the production system 100.

Further, if a failure in the production system 100 occurs, the historical data can be reviewed to determine if the processing detected excessive vibration of the failed equipment. If such failure occurred, the manufacturer of the failed equipment may adjust the vibration specification for the failed equipment to attempt to avoid the failure in the future.

Figure 6:
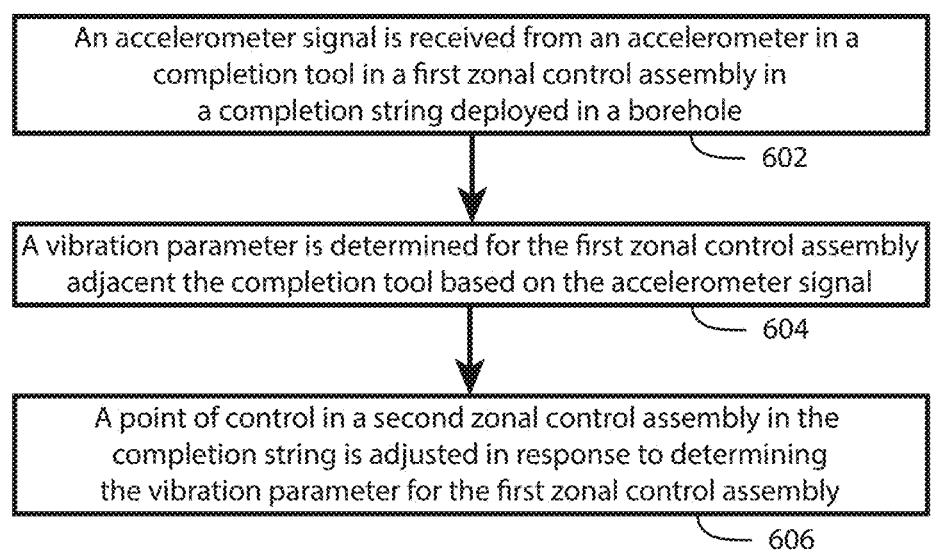
FIG. 6 is a flow chart showing using a downhole accelerometer to monitor flow-induced vibration.

FIG. 6 is a flow chart showing using a downhole accelerometer to monitor flow-induced vibration. An accelerometer signal is received from an accelerometer in a completion tool in a zonal control assembly in a completion string deployed in a borehole (block 602). A vibration parameter is determined for the zonal control assembly adjacent the completion tool based on the accelerometer signal (block 604). A point of control in a second zonal control assembly is adjusted in response to determining the vibration parameter for the first zonal control assembly (block 606). In some situations, two or more points of control in two or more zonal control assemblies are adjusted in response to determining the vibration parameter. For example, if analysis indicates that vibration adjacent to one zonal control assembly 120 is affected by the settings of that zonal control assembly 120 but also of one or more other zonal control assemblies 122, 124, points of control associated with the other zonal control assembly 122, 124 may also be adjusted in addition to adjusting the point of control associated with the zonal control assembly 120.

Further, it may be that it is not desirable to adjust a point of control for the zonal control assembly for which a vibration parameter indicates flow-induced vibration. For example, the owner or operator of the well may not want to reduce (or increase) production from (or injection into) the zone associated with that point of control or reduce (or increase) production enough to address a flow-induced vibration problem. In that case, other points of control may be adjusted to address the problem.

In one aspect, a well bore completion tool includes an accelerometer having an accelerometer output representative of acceleration of the well bore completion tool. The well bore completion tool includes a signal conditioning device coupled to the accelerometer output and producing a conditioned accelerometer output. The well bore completion tool includes an uplink coupled to the conditioned accelerometer output.

Implementations may include one or more of the following. The signal conditioning device may include an analog-to-digital converter. The well bore completion tool may include couplings configured to couple the well bore completion tool into a completion string. The well bore completion tool may include one or more of a pressure sensor and a temperature sensor. The accelerometer may be contained in an environmentally controlled package. The conditioned accelerometer output may contain information by which a vibration parameter concerning vibration of the well bore completion tool is determined. The conditioned accelerometer output may contain information by which flow-induced vibration in a zonal control assembly to which the well bore completion tool is coupled is determined.

In one aspect, a system includes a completion string deployed in a borehole. A completion tool is included in the completion string. An accelerometer is included in the completion tool. A valve is coupled to the completion string and operable to allow fluid communication between the completion string and a formation adjacent the borehole. A processor is coupled to the accelerometer and to the valve. The processor is programed to adjust the valve in response to data regarding acceleration of the completion tool received from the accelerometer.

Implementations may include one or more of the following. The system may include a second valve coupled to the completion string and operable to allow fluid communication between the completion string and a second formation adjacent to the borehole. The system may include a second completion tool in the completion string. The system may include a second accelerometer included in the second completion tool. The system may include a second processor coupled to the second accelerometer and the second valve. The second processor may be programed to adjust the second valve in response to data regarding acceleration of the second completion tool received from the second accelerometer. The processor and the second processor may be the same. The processor may be outside the borehole. The processor may be in the borehole.

In one aspect, a method includes measuring acceleration with an accelerometer in a first completion tool in a first zonal control assembly in a completion string deployed in a borehole to produce an accelerometer signal. The method includes determining a vibration parameter for the first zonal control assembly adjacent the first completion tool based on the accelerometer signal. The method includes adjusting a point of control in a second zonal control assembly in the completion string in response to determining the vibration parameter for the first zonal control assembly.

Implementations may include one or more of the following. Adjusting the point of control in the second zonal control assembly may include adjusting a valve operable to allow fluid communication between the second zonal control assembly and a formation adjacent the borehole. The method may include up-linking the conditioned accelerometer signal to a processor outside the borehole and determining the vibration parameter is performed by the processor outside the borehole. Adjusting the point of control in the second zonal control assembly may include down-linking an adjustment command from a processor outside the borehole to the point of control in the second zonal control assembly. The point of control in the second zonal control assembly may include a valve operable to allow fluid communication between the second zonal control assembly and a formation adjacent to the borehole. The second zonal control assembly may be the first zonal control assembly. The second zonal control assembly may be physically separate from the first zonal control assembly. The method may include receiving a second accelerometer signal from a second accelerometer in a second completion tool in the second zonal control assembly. The method may include determining a second vibration parameter for the zonal control assembly adjacent the second completion tool based on the second accelerometer signal. The method may include adjusting the point of control in the second zonal control assembly in response to determining the second vibration parameter.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A well bore completion tool comprising:
    an accelerometer having an accelerometer output representative of acceleration of the well bore completion tool, wherein the accelerometer is oriented with a first axis of sensitivity parallel to a longitudinal axis of the completion tool and with a second axis of sensitivity perpendicular to the longitudinal axis of the completion tool;
    a signal conditioning device coupled to the accelerometer output and producing a conditioned accelerometer output;
    an uplink coupled to the conditioned accelerometer output; and
    an information processing system configured to process data from the conditioned accelerometer output in the frequency domain to determine a response set of vibration frequencies of the well bore completion tool.

2. The well bore completion tool of claim 1 wherein the signal conditioning device includes an analog-to-digital converter.

3. The well bore completion tool of claim 1 further comprising:
    couplings configured to couple the well bore completion tool into a zonal control assembly.

4. The well bore completion tool of claim 1 further comprising: one or more of a pressure sensor and a temperature sensor.

5. The well bore completion tool of claim 1 wherein the conditioned accelerometer output contains information by which a vibration parameter concerning vibration of the well bore completion tool is determined.

6. The well bore completion tool of claim 1 wherein the conditioned accelerometer output contains information by which flow-induced vibration in a zonal control assembly to which the well bore completion tool is coupled is determined.

7. The system of claim 1, wherein an information processing system is further configured to process data from the conditioned accelerometer output in the time domain to determine a vibration intensity and/or subsequent time-dependent response changes of the well bore completion tool.

8. A system comprising:
    a completion string deployed in a borehole;
    a completion tool included in the completion string;
    an accelerometer included in the completion tool, wherein the accelerometer is oriented with a first axis of sensitivity parallel to a longitudinal axis of the completion tool and with a second axis of sensitivity perpendicular to the longitudinal axis of the completion tool;
    a valve coupled to the completion string and operable to allow fluid communication between the completion string and a formation adjacent the borehole;
    a processor coupled to the accelerometer and to the valve; and
    the processor programed to adjust the valve in response to data regarding acceleration of the completion tool received from the accelerometer.

9. The system of claim 8 further comprising:
    a second valve coupled to the completion string and operable to allow fluid communication between the completion string and a second formation adjacent to the borehole; and
    a second completion tool in the completion string;
    a second accelerometer included in the second completion tool;
    a second processor coupled to the second accelerometer and the second valve; and
    the second processor programed to adjust the second valve in response to data regarding acceleration of the second completion tool received from the second accelerometer.

10. The system of claim 8 further comprising:
    a second valve coupled to the completion string and operable to allow fluid communication between the completion string and a second formation adjacent to the borehole; and
    a second completion tool in the completion string;
    a second accelerometer included in the second completion tool;
    wherein the processor is further coupled to the second accelerometer and the second valve, and wherein the processor is programed to adjust the second valve in response to data regarding acceleration of the second completion tool received from the second accelerometer.

11. The system of claim 8 wherein the processor is outside the borehole.

12. The system of claim 8 wherein the processor is in the borehole.

13. The system of claim 8, wherein the accelerometer comprises a three-axis high temperature accelerometer, wherein the accelerometer comprises a third axis of sensitivity oriented perpendicular to the first axis of sensitivity and the second axis of sensitivity.

14. A method comprising:
measuring acceleration with an accelerometer in a first completion tool in a first zonal control assembly in a completion string deployed in a borehole to produce a first accelerometer signal, wherein the accelerometer is oriented with a first axis of sensitivity parallel to a longitudinal axis of the completion tool and with a second axis of sensitivity perpendicular to the longitudinal axis of the completion tool, and wherein the first zonal control assembly comprises a first interval control valve;
determining a first vibration parameter for the first zonal control assembly adjacent the first completion tool based on the first accelerometer signal; and
adjusting a second interval control valve of a second zonal control assembly in the completion string in response to determining the first vibration parameter for the first zonal control assembly.

15. The method of claim 14 wherein the second interval control valve is operable to allow fluid communication between the second zonal control assembly and a formation adjacent the borehole.

16. The method of claim 14 further comprising up-linking the first accelerometer signal to a processor outside the borehole, and wherein determining the first vibration parameter is performed by the processor outside the borehole.

17. The method of claim 14 wherein adjusting the second interval control valve of the second zonal control assembly comprises down-linking an adjustment command from a processor outside the borehole to the second interval control valve of the second zonal control assembly.

18. The method of claim 14 wherein the second zonal control assembly is physically separate from the first zonal control assembly.

19. The method of claim 14 further comprising:
receiving a second accelerometer signal from a second accelerometer in a second completion tool in the second zonal control assembly;
determining a second vibration parameter for the zonal control assembly adjacent the second completion tool based on the second accelerometer signal;
adjusting the interval control valve of the second zonal control assembly in response to determining the second vibration parameter.

20. A well bore completion tool comprising:
an accelerometer having an accelerometer output representative of acceleration of the well bore completion tool, wherein the accelerometer is oriented with a first axis of sensitivity rotated forty-five degrees from a longitudinal axis of the well bore completion tool and with a second axis of sensitivity perpendicular to the first axis of sensitivity;
a signal conditioning device coupled to the accelerometer output and producing a conditioned accelerometer output;
an uplink coupled to the conditioned accelerometer output; and
an information processing system configured to process data from the conditioned accelerometer output in the frequency domain to determine a response set of vibration frequencies of the well bore completion tool.

* * * * *